US005644071A

United States Patent [19]

Wagner

[11] Patent Number: 5,644,071

[45] Date of Patent: Jul. 1, 1997

[54] METHOD FOR GENERATING SMOKE AEROSOLS AND PYROLYSIS APPARATUS FOR CARRYING OUT THE METHOD

[75] Inventor: Ernst-Werner Wagner, Winsen/Aller, Germany

[73] Assignee: Wagner Alarm-und Sicherungs -systeme GmbH & Co., Germany

[21] Appl. No.: 617,817

[22] PCT Filed: Sep. 2, 1994

[86] PCT No.: PCT/EP94/02917

§ 371 Date: Feb. 28, 1996

§ 102(e) Date: Feb. 28, 1996

[87] PCT Pub. No.: WO95/06929

PCT Pub. Date: Mar. 9, 1995

[30] Foreign Application Priority Data

Sep. 3, 1993 [DE] Germany .......................... 43 29 847.8

[51] Int. Cl.$^{6}$ .................................................. G01M 19/00

[52] U.S. Cl. ........................... 73/23.33; 73/1.01; 73/1.06

[58] Field of Search .................................. 73/23.33, 1 R, 73/1 G, 31.02, 31.03; 131/71

[56] References Cited

U.S. PATENT DOCUMENTS

| | | | |
|---|---|---|---|
| 3,729,979 | 5/1973 | Wiberg et al. | 73/1 R |
| 3,924,442 | 12/1975 | Kerho et al. | 73/1 R |
| 3,976,450 | 8/1976 | Marcote et al. | 55/158 |
| 4,008,723 | 2/1977 | Borthwick, Jr. et al. | 131/2 |
| 4,170,127 | 10/1979 | Butera | 73/28 |
| 4,340,072 | 7/1982 | Bolt et al. | 131/273 |
| 4,516,424 | 5/1985 | Rowland | 73/23 |
| 4,789,524 | 12/1988 | Rio et al. | 422/53 |
| 4,947,874 | 8/1990 | Brooks, Jr. et al. | 131/329 |
| 5,042,509 | 8/1991 | Banerjee et al. | 131/71 |
| 5,074,137 | 12/1991 | Harris et al. | 73/31.02 |
| 5,105,831 | 4/1992 | Banerjee et al. | 131/194 |

*Primary Examiner*—Hezron E. Williams
*Assistant Examiner*—J. David Wiggins
*Attorney, Agent, or Firm*—Cesari and McKenna

[57] ABSTRACT

There is indicated a method of generating smoke aerosols for proper planning and testing and for demonstration of the effectiveness of fire alarm systems, and pyrolysis apparatus for carrying out the method. In the method a test piece, for example, an electrical cable or the like, is heated over a specific period of time, according to a first alternative, along a predeterminable temperature curve, or, according to a second alternative, is held at a constant or a well-nigh constant temperature. By means of the method according to the invention it is possible to simulate a reproducible progress of a real electrical fire in a compressed period of time.

10 Claims, 1 Drawing Sheet

Figure 1:
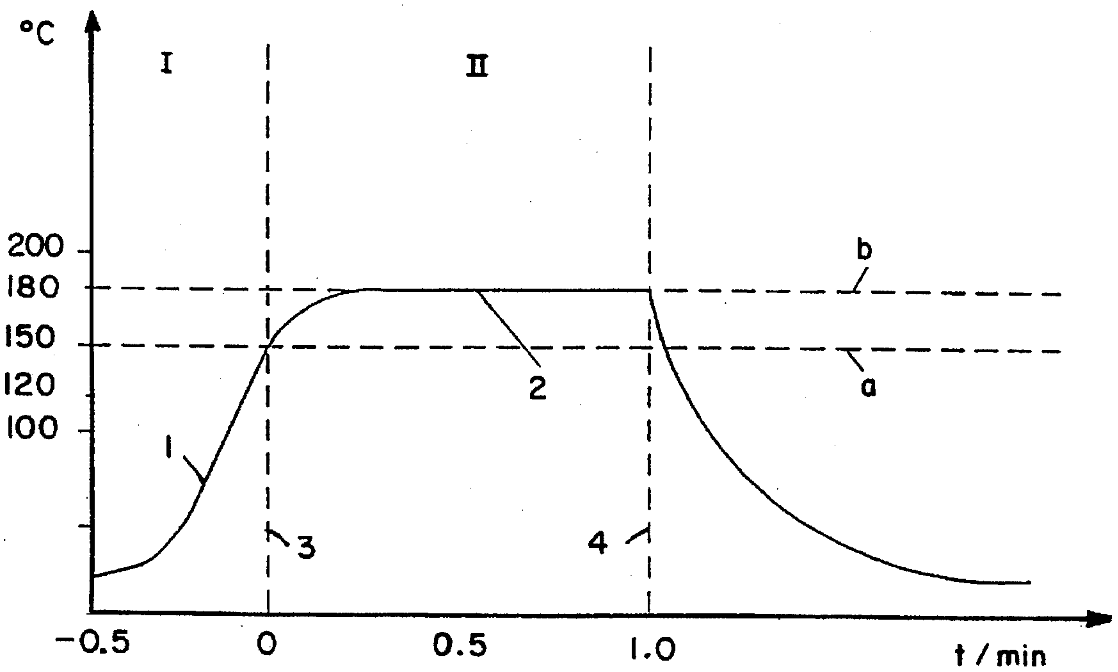

METHOD FOR GENERATING SMOKE AEROSOLS AND PYROLYSIS APPARATUS FOR CARRYING OUT THE METHOD

The invention relates to a method of generating smoke aerosols, particularly for the design, testing or demonstration of fire alarm systems, in which a test material is pyrolysed by heating the smoke aerosols thus being released, and to a pyrolysis apparatus for carrying out this method. For proper design and testing as well as for demonstration of fire alarm systems it is known to carry out smoke tests with a method of the type already mentioned, test material, for example a piece of electrical cable or a board, being heated until a smouldering fire arises during which smoke is generated. As the causes of fires in electrical or electronic installations are always overheating conditions on cables, soldering points or the like, the smoke tests are also carried out with such components as test material. During the design of fire alarm systems, the tests serve to ascertain where the detectors are to be located in the electronic installation or in the room in which the installation is positioned. Every installation, and also every room, due to the geometry, differing equipment with electronic and electrical components and due to the most varied types of air conditioning equipment, there are differing flow conditions, which must be taken into account in the design of fire alarm systems. When testing fire alarm systems the tests enable it to be ascertained whether the detectors installed are still in the correct position in the electronic installation or in the room after, for example, the disposition of the electronic installations in a room has been changed or new ones have been added. Within an electronic switchbox as well, the flow conditions are influenced for, example, by the fact that a board has been inserted or removed. Certain government regulations prescribe such tests for danger warning systems, i.e. also for fire alarm systems, at regular intervals. Finally, the tests named above serve to demonstrate the effectiveness of a fire alarm system, in order to have a positive influence on the decision of a purchaser to install such a system.

During the occurrence of fires, particularly electrical fires, three basic phases can be distinguished: the pyrolysis phase, in which the low-energy and invisible smoke aerosols are released, the smouldering fire phase, in which visible smoke aerosols are released, and the open fire in which smoke and flames arise. While conventional fire alarm systems, e.g. spot alarms, are activated in the last phase, the range of detection of modern early warning fire systems lies in the two first phases.

The Document DE-OS 22 04 801 discloses a method for generating smoke aerosols in a fire alarm system on the basis of ionization alarms, in which the components at risk from fire and to be protected, such as boards or cables, are treated with a smoke-generating substance which, when heated to a specific response temperature, releases visible smoke aerosols. These are then detected in a known way by ionization detectors, and an alarm is triggered.

The known method for generating smoke aerosols has disadvantages, particularly in its use in early warning fire systems, by means of which the occurrence of an overheating condition is to be detected. The weak point is the release of smoke aerosols, which is not reproducible or only inaccurately, so that it cannot be ascertained with certainty whether the response behaviour of the fire alarm system has changed since the last test or not. A further problem is the unrealistic progress of smoke generation; for this is effected extremely suddenly and at high concentration, whereas in most electrical fires the pyrolysis phase can extend over a period between hours and days, until a smouldering fire with visible smoke development occurs.

The purpose of the invention is to improve a method for generating smoke aerosols of the type already mentioned in such a way that a reproducible burning behaviour is achieved, as well as to indicate a pyrolysis apparatus for carrying out the method.

This purpose is fulfilled according to the invention by a method of the type already mentioned, in which the test material is heated over a specific period of time until its temperature, in dependence on the heating period, follows a specific predeterminable temperature curve, or is maintains approximately constant.

The pyrolysis apparatus according to the invention for carrying out this method is characterized by a regular source of electrical current with terminals for connecting to the test material, preferably a sheathed wire, in such a way that the current from the current source flows through it, and by at least one sensor for detecting the temperature of the material, the temperature of the material being capable of regulation in dependence on the period of heating.

The invention has the advantage that, by means of maintaining a predetermined temperature curve, a reproducible heating of the test material is effected, so that the test results for designing an early warning fire alarm system stand on the same basis, and are comparable with, the test results of monitoring of the system after its installation, which is repeated in a yearly cycle. Whereas in the previous methods described, an unrealistically rapid increase in the concentration of smoke aerosols leads to a rapid saturation of the detectors to be monitored, in the two alternatives of-the method according to the invention, a specific temperature curve is produced, which is reproducible at any time, in which visible smoke particles are released in an amount corresponding to the response sensitivity from the design of the early warning fire alarm system. The two alternatives differ in the chronological progress of the temperature of the test material: in one case, the temperature changes during the specific period of time in a likewise specific way, whereas in the other case it is held substantially constant over the specific period of time. The progress of the temperature curve is basically only of secondary importance; on the other hand, the important point is that the curve has a previously defined configuration which is thus reproducible at any time. For example, the smoke tests may be carried out on the basis of the so called "Unit Temperature Time Curve" according to DIN 4102 "Burning Behaviour of Building Materials". By means of this unit temperature time count, the fire resistance value of materials is tested, so that it can be desirable to use this temperature curve also as a basis for tests by the method according to the invention.

Advantageous further developments of the invention are specified in the secondary claims.

Whereas the constant or well-nigh constant temperature of the second alternative method can be basically any temperature lying above the pyrolysis temperature of the test material, it preferably corresponds to the smouldering fire temperature of the test material. As in the smouldering fire phase visible smoke aerosols are released, it is possible to use the more reliable optical smoke alarms, while in the pyrolysis phase, in which invisible smoke aerosols are released, ionisation smoke alarms or chemosensors are required.

The specific period of time, in which the test material is heated to the predetermined, time-dependent temperature or is held at a constant or almost constant temperature, is preferably defined by the required minimum and maximum response time of an early warning fire alarm system. This further development enables a particularly precise planning of early warning fire alarm systems.

It is of advantage if the specific period of time is preceded by a pre-heating phase, in which the test material is slowly heated up to its pyrolysis temperature. The test material is preferably an, e.g. coiled wire, which is sheathed with plastic. The pre-heating phase and the slow heating in this case have the advantage that the plastic does not harden, as would occur during rapid heating by melting and incrustation of the surface of the plastic. The release of smoke aerosols would be prevented or inhibited by the hardening of the plastic sheathing. Thus, this further development of the invention makes an important contribution to the simulation of the real progress of a fire: slow heating of the test material, passage through a pyrolysis phase with release of invisible smoke aerosols, and Smouldering fire phase with release of visible smoke aerosols at an amount corresponding to the planned response sensitivity of the early warning fire alarm system. After termination of the specific period of time, the smoke test is ended and the pyrolysis apparatus according to the invention switches off automatically.

The test material is preferably heated by having an electrical current flowing through it. As direct regulation of its temperature is difficult because of the necessary detection of measurement values, the temperature is set by regulation of the current. The influence of ambient temperature, e.g. by convection, may be minimised by use of a windshield.

The pyrolysis apparatus according to the invention can contain a plate upon which the test material is installed. This enables the pyrolysis apparatus to be used in switchboxes or the like substantially without the necessity to use components of the switch-box for supporting the test structure.

Advantageous is a box-shaped container for receiving the test material, with grid-like or perforated walls, preferably made of metal or metallised. The perforated walls enable the test material to be located without hindrance in the cooling air-flow of an electronic installation.

The metallic or metallized walls give rise to a Faraday Cage, which spatially restricts the electrical fields generated by the heating current in the test material. For this purpose the container is preferably earthed as a whole. This makes it possible to use the apparatus in an electronic installation without the fields arising disturbing the function of the installation.

Finally, the pyrolysis apparatus preferably contains a timer for measuring the response time of the early warning fire system to be tested or designed, or whose effectiveness is to be demonstrated. By means of this timer, the period of time between the start of the pyrolysis and the response of the early warning fire alarm system is measured.

Figure 2:
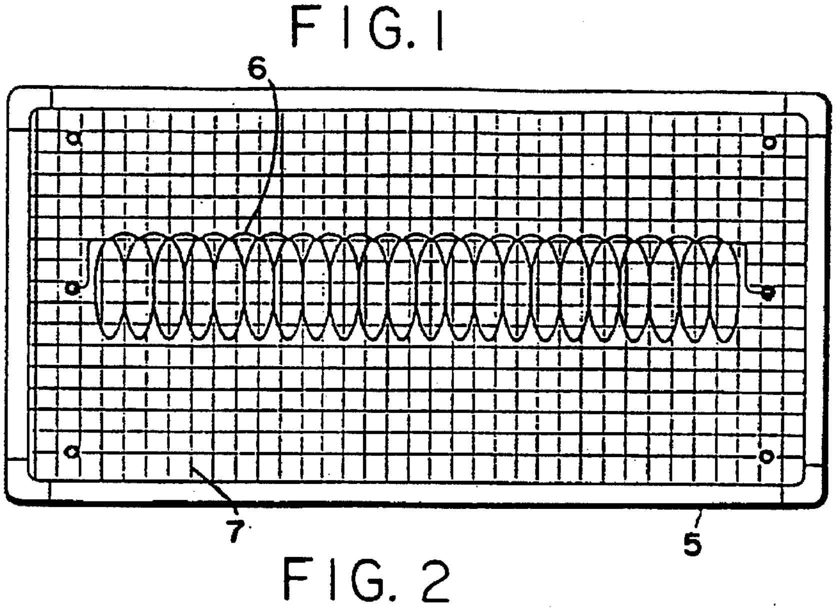
Figure 3:
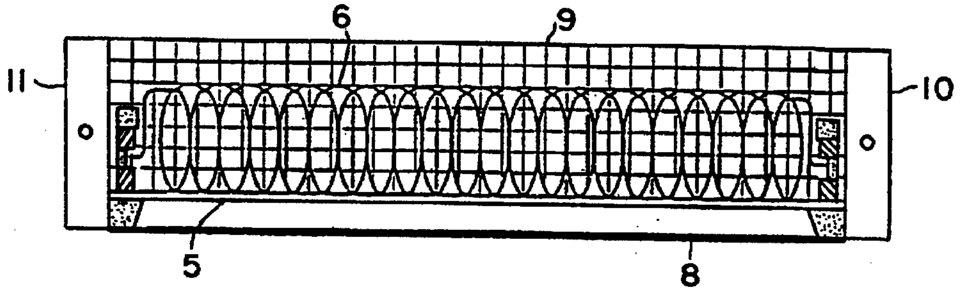

A preferred embodiment of the invention will be explained in more detail in the following with reference to a drawing. Shown are:

FIG. 1: a temperature configuration during a smoke test, given by way of example;

FIG. 2: a plan view of the plate of a pyrolysis apparatus with test material in a box with grid walls; and FIG. 3: a side elevation of the plate in the box according to FIG. 2.

Referring to FIG. 1, the method according to the invention is explained within the framework of a smoke test. The test material is a coiled plastic-sheathed electrical cable (test coil). In a pre-heating phase I, it is slowly heated to the pyrolysis temperature (a) of the plastic. Curve 1 shows the temperature progress of this heating over time. Thereafter, the temperature of the test material is increased slowly to the smouldering fire temperature (b), and kept constant by regulation over a specific period of time. Measurement of the response time is thus effected between the two points in time 3 and 4, the smoke test being terminated at point in time 4, and the temperature of the test material dropping sharply thereafter. The constant progress of the temperature of the test material in time period II is shown by the curve portion 2. The entire test section II thus corresponds to the pyrolysis phase and to the smouldering fire phase of an electrical fire.

In order to carry out the method according to the invention, pyrolysis apparatus is used with a source of current which may be regulated, with a terminal for connection to a test coil 6, through which the current from the source flows, with sensors for measuring the current flowing in the test coil 6, and with a microprocessor for regulating this current. According to FIGS. 2 and 3, the test coil 6 is installed on a plate 5, which is disposed in a box-shaped container with a grid-like base plate 8, cover plates 9 and side walls 10, 11. Due to the grid-like formation of all the walls of the container and also of the plate itself, it is possible to introduce the plate 5 with the test coil 6 into the cooling air stream of an electronic apparatus, without hindering the cooling air stream itself. In order to shield the electronic fields which are generated by the heating current in the test coil 6, all the walls 8–11 of the container consist of metal and are earthed (electrically grounded) during the smoke test.

I claim:

1. A method of generating smoke aerosols, especially for planning, testing or demonstration of a fire alarm system by simulating a pyrolysis phase or a smoldering fire phase or an open fire phase of hypothetical fire conditions, in which a test material, having a unit temperature, a smoldering fire temperature and a pyrolysis temperature is pyrolysed by heating and thus the smoke aerosols are released in a controllable and reproducible concentration into a space containing said system so as to allow simulation of the progress of a fire characterized in that the test material is heated over a specific period of time until its temperature, in dependence on the heating time, follows a specific, predeterminable unit temperature curve.

2. The method according to claim 1, characterized in that the temperature curve corresponds to the unit temperature time curve of the test material.

3. The method according to claim 1, characterized in that heating of the test material is held regulated over a specific period of time at a constant or well-nigh constant temperature.

4. The method according to claim 3, characterized in that the constant or well-nigh constant temperature corresponds to the smouldering fire temperature of the test material.

5. The method according to claim 3 characterized in that the specific period of time is fixed in accordance with the required minimum and maximum response times of an early warning fire alarm system.

6. The method according to claim 1 characterized in that, preceding the specific period of time is a pre-heating phase, in which the test material is heated slowly to its pyrolysis temperature so as to more realistically model a natural progressing fire which grows initially from a cooler warm condition towards a hot pyrolysis phase.

7. The method according to claims 1 or 3, characterized in that the test material is heated by having an electrical current flowing through it, and its temperature is determined by regulation of this current.

8. Pyrolysis apparatus for carrying out a method of generating smoke aerosols, especially for planning, testing and demonstrating a fire alarm system in which a test material is pyrolized by heating and thus smoke aerosols are released in a controllable and reproducible concentration characterized by an adjustable source of current with terminals for connection to the test material, preferably a sheathed wire, in such a way that the current flow from the current source flows through it, and through at least one sensor for detecting the temperature of the test material, the temperature of heating of the test material being adjustable in dependence on the heating time and a detector for detecting smoke aerosol concentration.

9. The pyrolysis apparatus according to claim 8, characterized by including a box-shaped container for receiving the test material, with grid-like or perforated walls, preferably made of metal or metallized material.

10. The pyrolysis apparatus according to claims 8 or 9, characterized by a timer for measuring the response time of the early warning fire alarm system to be tested or planned.

* * * * *